US008005853B2

(12) United States Patent
Cancilla et al.

(10) Patent No.: US 8,005,853 B2
(45) Date of Patent: Aug. 23, 2011

(54) METHOD AND SYSTEM FOR DYNAMICALLY ADJUSTING SEARCHES FOR DIAGNOSTIC INFORMATION

(75) Inventors: Jim J. Cancilla, San Jose, CA (US); Jeff Grier, Royal Oak, MI (US); Carl J. Krzystofczyk, Mount Prospect, IL (US); Brad Lewis, Gilroy, CA (US)

(73) Assignee: Snap-on Incorporated, Lincolnshire, IL (US)

( * ) Notice: Subject to any disclaimer, the term of this patent is extended or adjusted under 35 U.S.C. 154(b) by 700 days.

(21) Appl. No.: 10/984,132

(22) Filed: Nov. 9, 2004

(65) Prior Publication Data

US 2006/0101074 A1 May 11, 2006

(51) Int. Cl.
*G06F 17/30* (2006.01)
*G06F 7/00* (2006.01)

(52) U.S. Cl. ........ 707/759; 707/728; 707/752; 707/769; 701/29; 701/36

(58) Field of Classification Search ....................... 707/3
See application file for complete search history.

(56) References Cited

U.S. PATENT DOCUMENTS

| | | | | |
|---|---|---|---|---|
| 4,418,338 | A | 11/1983 | Burt | 340/578 |
| 4,418,388 | A | 11/1983 | Allgor et al. | 364/431.1 |
| 4,658,370 | A | 4/1987 | Erman et al. | 364/513 |
| 4,796,206 | A | 1/1989 | Boscove et al. | 364/551.01 |
| 5,157,668 | A | 10/1992 | Buenzli et al. | |
| 5,250,935 | A | 10/1993 | Jonker et al. | 345/134 |
| H1273 | H | 1/1994 | Novick | 434/224 |
| 5,337,320 | A | 8/1994 | Kung | 371/15.1 |
| 5,442,549 | A | 8/1995 | Larson | 364/424.01 |
| 5,533,093 | A | 7/1996 | Horton et al. | 379/21 |
| 5,541,840 | A * | 7/1996 | Gurne et al. | 701/33 |
| 5,633,197 | A | 5/1997 | Lur et al. | 438/668 |
| 5,835,871 | A | 11/1998 | Smith et al. | 701/29 |
| 6,141,608 | A | 10/2000 | Rother | 701/33 |
| 6,542,799 | B2 * | 4/2003 | Mizutani et al. | 701/33 |
| 6,768,935 | B1 * | 7/2004 | Morgan et al. | 701/29 |

(Continued)

FOREIGN PATENT DOCUMENTS

EP 991 0 8097.9 4/2002

(Continued)

OTHER PUBLICATIONS

International Search Report and Written Opinion for International Application No. PCT/US2005/040237 mailed Mar. 9, 2006.

*Primary Examiner* — Greta L Robinson
*Assistant Examiner* — James J Wilcox
(74) *Attorney, Agent, or Firm* — McDonnell Boehnen Hulbert & Berghoff LLP

(57) ABSTRACT

A diagnostic device receives a first set of search criteria related to a problem with a vehicle, and the diagnostic device stores the first set of search criteria. In response to receiving a second set of search criteria, the diagnostic device can compare it with the first set of search criteria in order to identify a pattern between the two sets of search criteria. The diagnostic device can then alter the second set of search criteria based on the pattern between the two sets of search criteria.

9 Claims, 3 Drawing Sheets

U.S. PATENT DOCUMENTS

| | | | | |
|---|---|---|---|---|
| 6,768,997 | B2 * | 7/2004 | Schirmer et al. | 707/102 |
| 6,845,370 | B2 * | 1/2005 | Burkey et al. | 707/3 |
| 7,092,937 | B2 * | 8/2006 | Morgan et al. | 707/3 |
| 2002/0007237 | A1 * | 1/2002 | Phung et al. | 701/33 |
| 2003/0009271 | A1 * | 1/2003 | Akiyama | 701/33 |
| 2003/0200208 | A1 | 10/2003 | Sajwan et al. | |
| 2004/0199542 | A1 | 10/2004 | Morgan et al. | |
| 2005/0004835 | A1 * | 1/2005 | Roslansky et al. | 705/14 |
| 2005/0022114 | A1 * | 1/2005 | Shanahan et al. | 715/513 |
| 2005/0027705 | A1 * | 2/2005 | Sadri et al. | 707/5 |
| 2005/0055331 | A1 * | 3/2005 | Sauermann et al. | 707/1 |
| 2005/0055341 | A1 * | 3/2005 | Haahr et al. | 707/3 |
| 2005/0060311 | A1 * | 3/2005 | Tong et al. | 707/7 |

FOREIGN PATENT DOCUMENTS

| | | | |
|---|---|---|---|
| EP | 1 229 320 | A | 8/2002 |
| JP | 63 079031 | A | 8/1988 |
| WO | WO 00/16060 | A | 3/2000 |

* cited by examiner

METHOD AND SYSTEM FOR DYNAMICALLY ADJUSTING SEARCHES FOR DIAGNOSTIC INFORMATION

FIELD OF THE INVENTION

This invention relates generally to vehicle diagnostics. More specifically, it relates to a method and system for dynamically adjusting search results in a vehicle diagnostic system.

BACKGROUND

A user may use a diagnostic device to aid in diagnosing problems with a vehicle. In one application, the user can enter various search criteria into the diagnostic device. The search criteria might include terms related to the vehicle, such as a vehicle identification number ("VIN") or a make/model, and it might also include terms related to a particular problem with the vehicle. For example, in order to diagnose a problem causing a 2002 Corvette not to start, the user might enter the search string "2002 Corvette No Start" into the diagnostic device.

Once the diagnostic device receives the search string, it then performs a search of diagnostic materials and returns a list of results to the user. Where the diagnostic materials are stored on the diagnostic device, the diagnostic device itself might perform the search. Alternatively, the diagnostic device might send the search string to a remotely located search engine, which can perform the search and return the results to the diagnostic device. In either case, once the diagnostic device obtains the results to the search, it can then display those results on the diagnostic device.

In this particular example, the search might return a long list of problems that would cause the vehicle not to start. The user can then browse the results, and the user can select one or more of the results in order to view more information associated with the selected results. For example, for each result, the diagnostic device might only display part of the entry, which the user can select similar to a hyperlink in order to view the full entry. Oftentimes, the user will browse several of the results in order to find one that the user believes might be most applicable to the particular problem.

If the user does not find a satisfactory result, then the user might perform an entirely new search using a different search string. The second query would be directed toward the same problem (e.g., not starting) but might include different search terms. The user might broaden the query if the results from the first search were too narrow, or the user might narrow the query if the results from the first search were too broad. For example, the first search might have returned a number of results related to the fuel injector as the cause of the vehicle not starting. However, the user might believe the problem is related to the solenoid rather than the fuel injector. So, for the second search the user might enter the search string of "2002 Corvette starter solenoid". This search string would then return results related to the solenoid rather than with the fuel injector.

The user can again browse the results, and based on the results the user might again refine the search string and perform yet another search. The process of refining the search criteria and running repeated searches can continue until the user either finds the desired results or gets frustrated and abandons the searches in favor of another method for determining the problem with the vehicle. Even if the user does eventually find the desired result, this searching process might take at least several iterations. This can increase the total amount of time it takes a repair technician to diagnose the problem with the vehicle, thereby also increasing the total cost associated with diagnosing the problem.

Therefore, there exists a need for improved methods for searching diagnostic data.

SUMMARY

A diagnostic device can receive a first set of search criteria related to a problem with a vehicle. The diagnostic device can perform a first search using the first set of search criteria, and the diagnostic device can additionally store the first set of search criteria. The diagnostic device can also receive a second set of search criteria, which it can compare against the first set of search criteria in order to determine a pattern between the two sets of search criteria. Based on the pattern, the diagnostic device may alter the second set of search criteria prior to performing the second search. For example, the diagnostic device might expand the second set of search criteria based on a common problem being searched in both the first and second searches. In another example, the diagnostic device might exclude search criteria from the second set of search criteria.

In another aspect, the diagnostic device can display results of the first search on the diagnostic device. The user can then select one or more of the results to view, and the diagnostic device can save an indication of which of the results were viewed. After performing a second search and receiving results to the second search, the diagnostic device can reorder the results to the second search based on those results to the first search that were viewed by the user. For example, for any results to the first search that were viewed by the user and that are also results to the second search, the diagnostic device might move those results to a lower position in the list of results to the second search.

In another example, the diagnostic device might reorder the results of the second search based on types of results to the first search that were viewed by the user. For instance, the user might view one or more results of the first search that deal with problems with a fuel injector. After performing a second search and receiving results to the second search, the diagnostic device might reorder the results of the second search to move results dealing with problems with a fuel injector to a lower position in the list. This might cause some results to be reordered even though they were not results to the first search, or if they were results to the first search, even though they were not viewed by the user. These are merely examples, and other reorderings of the results to the second search are also possible.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

I. System Overview

Figure 1:
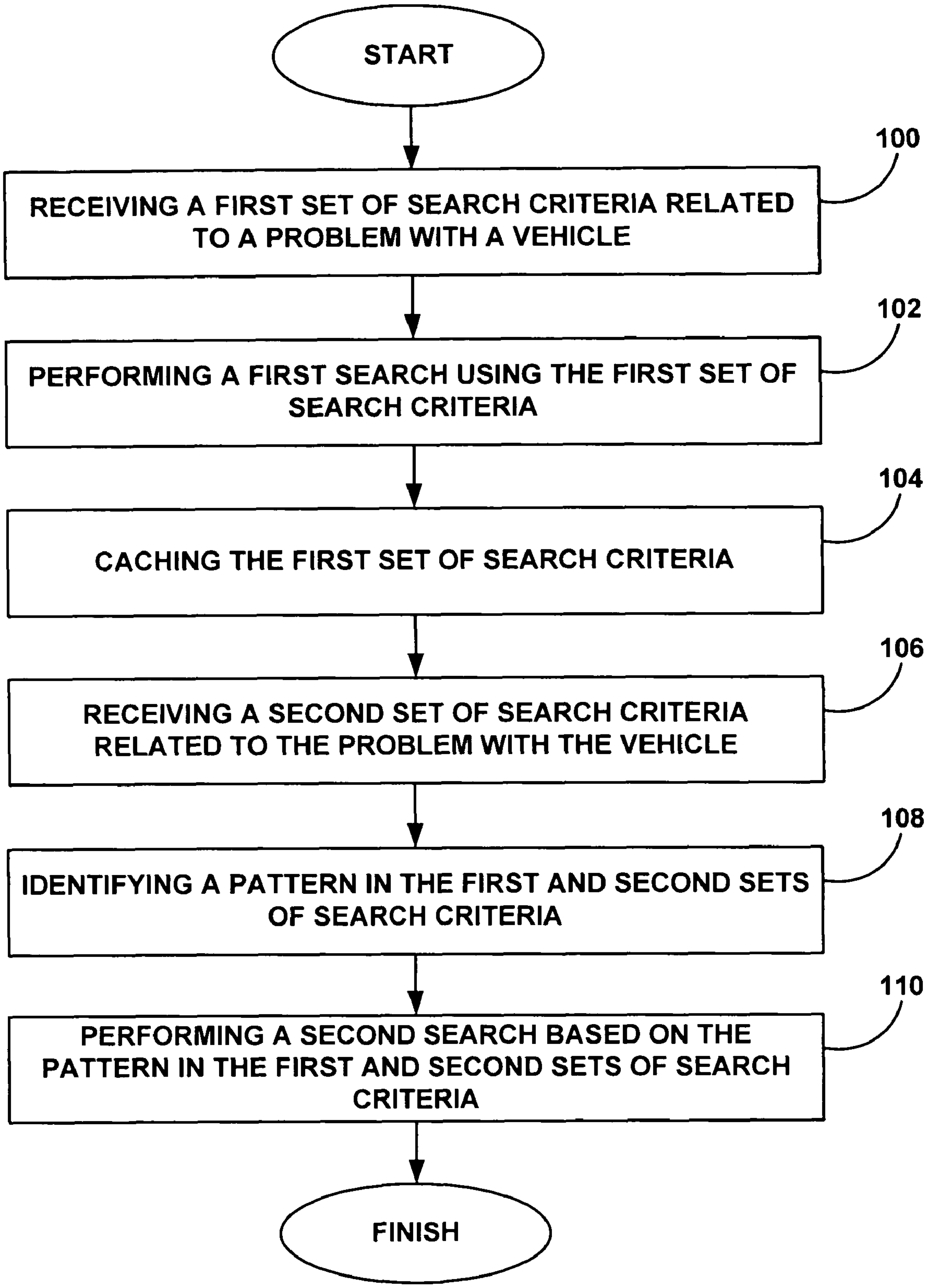
FIG. 1 is a flowchart of an exemplary method for the diagnostic device to search vehicle diagnostic information.

A user, such as a vehicle repair technician, can use a diagnostic device in order to obtain information used to diagnose and fix a problem with a vehicle. The diagnostic device may be any type of device, such as a handheld device. For example, the vehicle repair technician might use a personal digital assistant ("PDA") or other such handheld device as the diagnostic device. Alternatively, the diagnostic device might not be a handheld device but rather might be a desktop computer, a laptop computer or some other type of diagnostic equipment.

In one embodiment, the diagnostic device interfaces directly with one or more components in the vehicle so as to obtain data about the vehicle's current state of operation. In another embodiment, the diagnostic device interfaces with other diagnostic equipment, which in turn connects to one or more components inside the vehicle in order to receive data from those components. Alternatively, the diagnostic device might not interface with the vehicle at all, but rather it might just be used by the vehicle repair technician to access and retrieve diagnostic information about the vehicle without actually also receiving data from various systems in the vehicle.

In one operation, the vehicle repair technician can use the diagnostic device to perform searches for relevant information used to diagnose a problem with the vehicle. For example, the vehicle repair technician can enter various search terms, which the diagnostic device can then use to search available information sources and return relevant entries based on the search terms entered by the vehicle repair technician. The information sources can be any type of electronically searchable information source, such as web pages, digital user/diagnostic manuals, digital recall notices, proprietary or third party diagnostic sources or other such information sources.

These information sources may be stored on the diagnostic device, in which case the diagnostic device can access them directly. Alternatively, some or all of the information sources might be remotely located from the diagnostic device. For example, the diagnostic device might include one or more network interfaces, which the diagnostic device can use to access one or more data networks (e.g., a LAN, WAN, intranet, Internet, etc. . . . ) and communicate with other devices that also have connectivity to one or more of these data networks. Thus, the diagnostic device might use a network interface in order to access one or more of the remotely stored information sources.

Upon receiving a search string, the diagnostic device itself can perform the search of available information sources in order to generate a list of results based on the search terms entered by the vehicle repair technician. In this embodiment, the diagnostic device would itself serve as the search engine to perform the search. Alternatively, the diagnostic device might send the search string to another device, such as a device on one of the data networks. This other device might act as the search engine to perform the search and return the results to the diagnostic device.

The diagnostic device may receive several search strings from the vehicle repair technician related to the same problem with the vehicle. In order to more efficiently aid the vehicle repair technician in performing searches and determining the cause of the problem with the vehicle, the diagnostic device may use one or more methods to dynamically enhance the searches. In one embodiment, the diagnostic device might determine patterns between first and second search strings entered by the vehicle repair technician. The diagnostic device might then use the patterns between the first and second search strings to expand the second search string to include additional, related terms based on the identified pattern. This might cause the second search to return additional results related to different possible causes of the problem, thereby allowing the vehicle repair technician to more efficiently diagnose the problem. In another embodiment, the diagnostic device might exclude certain terms in the second search string that were previously used in the first search string, thereby potentially reducing a repetition of results and excluding less relevant results.

In another embodiment, the diagnostic device might track the results of a first search that were viewed by the vehicle repair technician. A second search performed by the vehicle repair technician might return some of the same results that were previously viewed by the vehicle repair technician. Before displaying the results of the second search, the diagnostic device might reorder the results so as to move those results that were previously viewed lower in the display of results to the second search. The diagnostic device might alternatively reorder the results to the second search based on types of results to the first search that were viewed by the user.

II. Dynamically Enhancing Search Criteria

In one embodiment for dynamically enhancing search criteria, the diagnostic device might use search criteria from a first search to dynamically alter search criteria for a second search, thereby potentially expanding the list of results that the second search returns.

For example, the vehicle repair technician might enter a first search string of "2002 Corvette No Start". The four different words for this search string (e.g., "2002", "Corvette", "No" and "Start") would generally constitute the search criteria for the first search. While the vehicle repair technician might enter the search string directly, the vehicle repair technician might alternatively specify the search criteria in some other manner (e.g., selecting terms from a drop-down menu) and the diagnostic device might then combine the selected search criteria to form the search string.

Once the vehicle repair technician enters the search string, the diagnostic device executes the search. If the diagnostic device is the search engine, then the diagnostic device might perform the search itself. If the diagnostic device is not the search engine, then the diagnostic device might send the search string to the search engine (e.g., via one or more data networks), which can then perform the search and return the results to the diagnostic device. The results might be in an ordered list, for example, with entries toward the top of the list being more relevant than entries toward the bottom of the list. For example, the entries at the top of the list might contain all the search criteria. Entries that are progressively lower in the list might then generally contain a progressively lower number of the search criteria or have some other progressively lower relevance.

The diagnostic device can then display the results to the vehicle repair technician. For each entry in the list, the diagnostic device might only display part of the entry. The vehicle repair technician can then select the entry (similar to a hyperlink) in order to view the full entry. Additionally, the diagnostic device might only display a predetermined number of the entries on the diagnostic device, for example, due to display size limitations. The vehicle repair technician might then page to entries that were not originally displayed on the diagnostic device.

In addition to performing the search using the first search string, the diagnostic device might also cache the first search string for later use. For example, the diagnostic device might store the first search string in its volatile memory, (e.g., RAM), but alternatively it might store the search string to its non-volatile memory (e.g., hard disk). These are merely examples, and the diagnostic device might store the first search string in a variety of other ways. By storing the first search string, the diagnostic device can later access the first search string in order to dynamically enhance a second search string entered by the vehicle repair technician.

After running the first search (e.g., “2002 Corvette No Start”), the vehicle repair technician might run a second search related to the same problem. For example, the vehicle repair technician might enter the second search string of “2002 Corvette starter solenoid”. That is, the vehicle repair technician might not have found a satisfactory result from the first search and might refine the search criteria for a second search. These two searches share some of the same search criteria. For example, each search string includes “2002” and “Corvette”. These two searches also share related, but still different, search criteria. For example, the first search string includes the search criteria “No Start,” which is directed toward a particular problem with the vehicle. The second search string includes the search criteria “starter solenoid,” which involves a particular ignition component that might have an effect on the no start problem queried in the first search.

Upon receiving the search criteria for the second search, the diagnostic device can retrieve from memory the search criteria for the first search. Then, the diagnostic device can compare the two sets of search criteria in order to identify a possible pattern in the searches performed by the vehicle repair technician. For example, the diagnostic device can determine that the two sets of search criteria both include “2002 Corvette.” From this similarity, the diagnostic device can determine that both searches are directed toward the same vehicle, and therefore it is likely that there is a correlation between the two searches. That is, if the searches were directed toward different vehicles, then it might be more likely that the second search performed by the vehicle repair technician was not related to the first search.

The diagnostic device might alternatively determine that two searches are directed toward the same vehicle by matching other criteria, such as VINs or other such identifying criteria. In order to make this determination, it is not necessary that the two criteria be identical. For example, one search might use “2002 Corvette” while the other search might use a VIN. Using a lookup table or some other mechanism that associates VINs with a year/make/model, the diagnostic device might determine that the VIN corresponds to a 2002 Corvette and therefore that the two searches are directed toward the same vehicle. These are merely examples, and other methods of determining that the two searches are related might also be used.

Once the diagnostic device determines that the two searches are related, it might then compare other search criteria in order to identify a pattern in the searching. In this example, the diagnostic device compares the remaining terms “no start” and “starter solenoid” to determine a pattern in the searching. The diagnostic device might use a variety of different methods in order to determine whether a pattern exists between the two search strings. For example, the diagnostic device might use a lookup table that correlates one search term with other terms that would establish the presence of a particular pattern. Using the lookup table, the diagnostic device might determine that “no start” correlates with “starter solenoid” to establish a pattern of searching for problems related to the ignition system.

A lookup table, while potentially simple to implement, is not the only method that might be used to determine whether a pattern exists between the two search strings. The diagnostic device might use more complex comparison algorithms. For example, the diagnostic device might use heuristic algorithms, artificial intelligence algorithms, neural networks or any of the multitudes of other comparison algorithms that are available in order to determine whether a pattern exists between the two search strings.

It is also possible that the diagnostic device might apply two or more algorithms to the same search strings in order to determine whether a pattern exists. For example, the diagnostic device might apply a first algorithm (e.g., a lookup table) to determine whether a pattern exists. If the diagnostic device does not find a pattern, then it might apply a second algorithm (e.g., a heuristic algorithm) in order to try and discern a pattern. Alternatively, the diagnostic device might apply both algorithms without regard to the results of a first one of the algorithms. Other methods for applying various algorithms are also possible.

Once the diagnostic device determines a pattern in the search strings, the diagnostic device might alter the second search string based on the identified pattern. For example, in this case, the diagnostic device determines that the pattern is that both search strings are searching for problems related to the ignition system. Although the second search string includes “starter solenoid,” which is one possible problem with the ignition system, this might not necessarily be the particular problem with the vehicle. That is, some problem other than the starter solenoid might be causing the vehicle not to start. In order to obtain results related to other possible causes of the ignition system problem with the vehicle, the diagnostic device might expand the second search string.

For example, once the diagnostic device determines that the user is querying problems related to the ignition system, the diagnostic device might use an internal reference database to find various key words corresponding to problems with the ignition system. Accessing the internal reference database with “ignition system” might return the keywords of “fuel injector,” “battery,” “neutral safety switch,” and “starter solenoid.” These key words are merely examples, however, and regardless of the particular keywords returned, the diagnostic device can then use them to supplement the second search string.

In one method for supplementing the second search string, the diagnostic device might use the logical OR operator in order to add these keywords to the search string. In one example, the diagnostic device adds these onto the end of the existing search string, thereby creating the logical search string: 2002 AND Corvette AND “starter solenoid” OR “fuel injector” OR “battery” OR “neutral safety switch.” Since the second search string originally included the keyword “starter solenoid”, it would not be necessary to duplicate this keyword. In another example, the diagnostic device can logically OR these additional keywords with the existing keywords in the second search string, thereby creating the logical search string: 2002 AND corvette AND (“starter solenoid” OR “fuel injector” OR “battery” OR “neutral safety switch”). These are merely examples, and other methods for adding the additional keywords might alternatively be used.

While the diagnostic device might supplement the search string based on a pattern with the first search string, the diagnostic device might also expand the first search string. For example, if the user enters "2002 Corvette No Start", then the diagnostic device might use the internal reference database to identify additional keywords related to "no start," which can then be added to the second search string. For instance, the internal reference database might associate "no start" with the keywords of "starter solenoid," "fuel injector," "battery," and "neutral safety switch." After retrieving these keywords, the diagnostic device can add them to the first search string in order to more efficiently focus the results on those possible causes to the no start problem.

In one variation, the internal reference database might be created to associate a particular problem (e.g., "no start") with only keywords for one or more likely causes of the problem. For example, while the four previously described keywords might all potentially cause the corvette not to start, the battery might more often cause the corvette not to start than the other three problems. Therefore, the internal reference database might be created to associate the no start problem with just the keyword of "battery." Other variations, however, might use keywords for a greater number of likely problems. Thus, the search string would then be expanded to include the keywords for these more likely causes but not the keywords for other less likely possible causes.

In another embodiment, the diagnostic device might exclude keywords from the second search string, and the excluded keywords might be based on keywords from the first search string. For example, the first search string might be "2002 Corvette No Start Fuel Injector." Thus, the user is attempting to diagnostic a starting problem caused by the fuel injector. This search string might return various results, which the user can then browse in order to determine a possible cause. After browsing, the user might enter a second search string of "2002 Corvette No Start Starter Solenoid." Thus, the user might determine that the fuel injector is not the problem and try to isolate a different cause of the problem.

In this case, it might be likely that the user has determined that the fuel injector is not the problem. Even though the second search string does not include the keywords "fuel injector," it still might result in obtaining some results that are directed toward problems with the fuel injector, such as results that contain both "starter solenoid" and "fuel injector." Some less relevant results, such as those including "fuel injector" along with some of the keywords (e.g., "2002 Corvette No Start") but not others (e.g., "starter solenoid"), might also be returned as results the second search. In order to remove some of the results, the diagnostic device might modify the second search string based on one or more search criteria in the first search string.

For example, after determining that the user has removed "fuel injector" and replaced it with "starter solenoid," the diagnostic device might exclude results that include that first keyword. This might be done, for example, using the logical NOT operator. In one operation, the diagnostic device might alter the second search string to create the logical search string: 2002 AND corvette AND no AND start AND starter AND solenoid AND NOT (fuel OR injector). Depending on how the user enters the search string, such as by grouping keywords, the diagnostic device might create the slightly different second search string of: 2002 AND corvette AND (no start) AND (starter solenoid) AND NOT (fuel injector).

This alteration would generally prevent the second search from returning results that include the phrase "fuel injector," even if they did also include "starter solenoid." Since the user already determined that the fuel injector was likely not the cause of the problem, this alteration might help to prevent the second search from returning extraneous results, thereby allowing the user to more quickly parse through the results to the second search.

One example of an embodiment may take the form of a method for a diagnostic device to search for vehicle diagnostic information. In accordance with the method, a first search string for a first search is received from a user of the diagnostic device. The first search is initiated using the first search string. Results of the first search are received and displayed on the diagnostic device. A request to view at least one of the results of the first search is received from the user. A second search string for a second search is received from the user. It is determined that at least one term in the first search string is related to at least one term in the second search string. Based on the results of the first search that were requested to be viewed by the user of the diagnostic device, the second search string is altered to create an altered second search string. The second search is initiated using the altered second search string.

III. Dynamically Adjusting Search Results

In one embodiment for dynamically adjusting search results, the diagnostic device can use results from a first search that were viewed by the user of the diagnostic device as a basis for reordering results to a second search.

For example, after running the first search, the diagnostic device can receive an ordered list of results to the first search and then display them on the diagnostic device. The user might then select one or more of the results in the list to be viewed on the device. For example, the list might only show a partial entry for each result, and the user might select a result in order to view the full entry. The diagnostic device can store indications of one or more of the results that were viewed by the user. After determining that the results do not provide sufficient information, the user might run a second query.

After running the second query, the diagnostic device obtains an ordered list of results to the second query. The diagnostic device can then compare the results from the first search that were viewed against all the results to the second search. For those results to the first search that were viewed and that also appear in the results to the second search, the diagnostic device can move them lower in the list of results to the second search. That is, results to the second search that were previously viewed by the user can be moved lower in the list of results to the second search.

In another embodiment, results that were not viewed but that have a similar type or similar keywords to those that were viewed might also be moved lower in the list of results to the second search. For example, the user might view one or more results to the first search that have the keyword "fuel injector" or that are directed toward problems with the fuel injector. The diagnostic device might then reorder the list of results to the second search that include the keyword "fuel injector" or are directed toward problems with the fuel injector to a lower position in the list. This might cause some results to the second search that were also results to the first search be moved to a lower position even though they were not previously viewed by the user, and it might cause some results to the second search to be moved to a lower position even though they were not even results to the first search.

IV. Exemplary Operation

FIG. 1 is a flowchart of an exemplary method for the diagnostic device to search vehicle diagnostic information. At Step 100, the diagnostic device receives a first set of search criteria related to a problem with a vehicle. At Step 102, the diagnostic device performs a first search using the first set of search criteria. At Step 104, the diagnostic device caches the first set of search criteria. Although this figure depicts Step 104 occurring after Step 102, the diagnostic device might alternatively cache the first set of search criteria before performing the search or while it is performing the search.

The diagnostic device next receives a second set of search criteria related to the problem with the vehicle, as shown at Step 106. The diagnostic device then identifies a pattern in the first and second sets search criteria, as shown at Step 108. Then, the diagnostic device performs a search based on the pattern in the first and second sets of search criteria. For example, based on the pattern, the diagnostic device might identify additional search criteria to be used in the second search. Thus, the second search might use some or all of the criteria that were specified by the user, and it might also include additional search criteria based on the identified pattern.

As previously described, this method might be performed by the diagnostic device regardless of whether it also serves as the search engine. For example, where the diagnostic device includes a search engine, the diagnostic device might perform the search itself. However, where the diagnostic device does not include a search engine, it might perform the search by sending the search criteria to a remotely located search engine.

This method might alternatively be performed by a search engine apart from the diagnostic device. For example, the search engine might receive the first set of search criteria from the diagnostic device. The search engine might perform the first search and then save the first set of search criteria. Upon receiving a second set of search criteria from the diagnostic device, the search engine can then determine a pattern between the first and second searches before performing the second search.

Figure 2A:
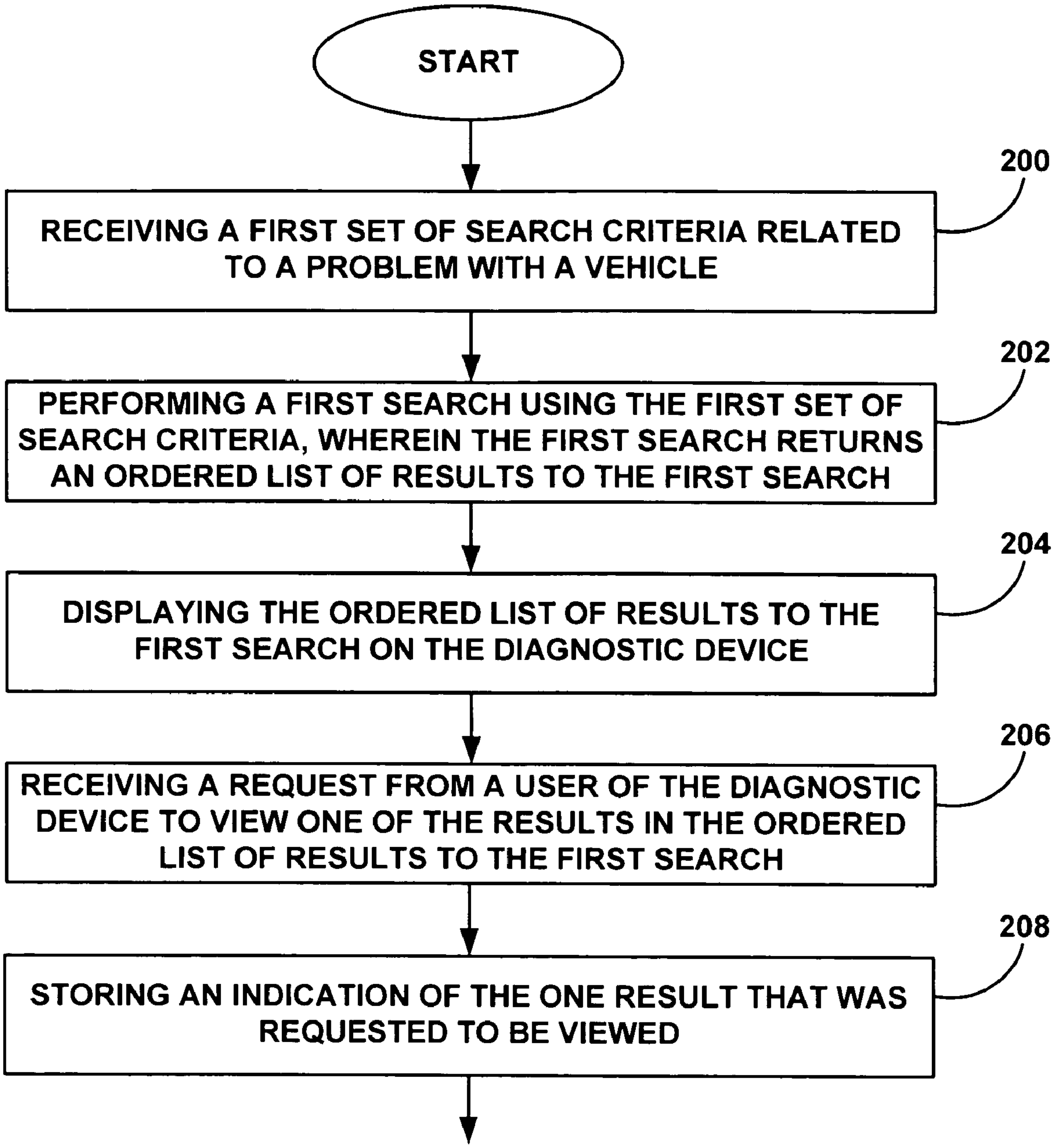
FIGS. 2A-B are a flowchart of an alternate method for the diagnostic device to search vehicle diagnostic information.
Figure 2B:
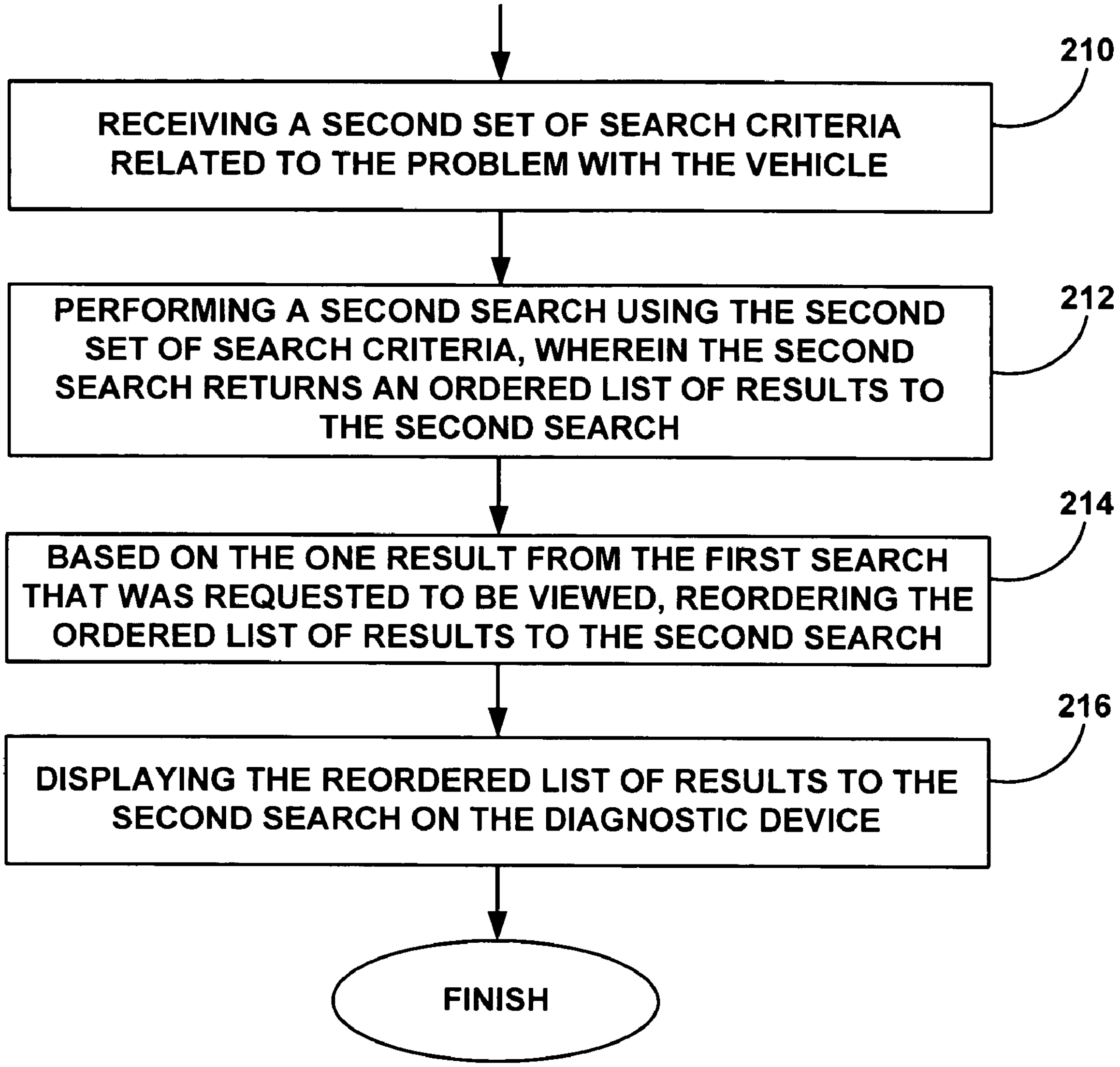

FIGS. 2A-B are a flowchart of an alternate method for the diagnostic device to search vehicle diagnostic information. FIG. 2A illustrates the first part of the method, which continues to FIG. 2B. At Step 200, the diagnostic device receives a first set of search criteria related to a problem with a vehicle. At Step 202, the diagnostic device performs a first search using the first set of search criteria, wherein the first search returns an ordered list of results to the first search. The diagnostic device then displays the ordered list of results to the first search, as shown at Step 204. Next, the diagnostic device receives a request from a user of the diagnostic device to view one of the results in the ordered list of results to the first search, as shown at Step 206. The diagnostic device then stores an indication of the one result that was requested to be viewed, as shown at Step 208.

At Step 210, the diagnostic device receives a second set of search criteria related to the problem with the vehicle. The diagnostic device then performs a second search using the second set of search criteria, wherein the second search returns an ordered list of results to the second search, as shown at Step 212. Then, based on the result from the first search that was requested to be viewed, the diagnostic device reorders the ordered list of results to the second search, at shown at Step 214. Finally, the diagnostic device displays the reordered list of results to the second search, as shown at Step 216.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

One embodiment may take the form of a computer readable medium having stored therein instructions for causing a processor to perform the following steps: receiving a first set of search criteria related to a problem with a vehicle; performing a first search using the first set of search criteria; caching the first set of search criteria; receiving a second set of search criteria related to the problem with the vehicle; identifying a pattern in the first and second sets of search criteria; and performing a second search based on the pattern in the first and second sets of search criteria.

Another embodiment may take the form of a computer readable medium having stored therein instructions for causing a processor to perform the following steps: receiving from a user of a diagnostic device a first search string for a first search; initiating the first search using the first search string; receiving results of the first search; displaying on the diagnostic device the results of the first search; receiving from the user a request to view at least one of the results of the first search; receiving from the user a second search string for a second search; determining that at least one term in the first search string is related to at least one term in the second search string; based on the results of the first search that were requested to be viewed by the user of the diagnostic device, altering the second search string to create an altered second search string; and initiating the second search using the altered second search string.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A computer-implemented method for a vehicle diagnostic device to dynamically enhance a user-input query for searching vehicle diagnostic information, the method comprising:

a vehicle diagnostic device receiving a first user-input query that (1) identifies a given vehicle and (2) includes a first set of one or more keywords related to a given problem with the given vehicle;

the vehicle diagnostic device caching the first user-input query, performing a first search using the first user-input query, and displaying results of the first search, the results of the first search relating to at least one possible cause of the given problem;

after displaying the results of the first search, the vehicle diagnostic device receiving a second user-input query that (1) identifies the same given vehicle and (2) includes a second set of one or more keywords related to the same given problem with the same given vehicle, wherein the second set of keywords is different than the first set of keywords;

after receiving the second user-input query, the vehicle diagnostic device making a determination that (1) both the first and second user-input queries identify the same given vehicle and (2) both the first and second sets of keywords relate to the same given problem with the same given vehicle;

responsive to making the determination, the vehicle diagnostic device altering the second user-input query, wherein altering the second user-input query involves at least one of (1) adding at least one additional keyword to the second set of keywords and (2) removing at least one keyword from the second set of keywords; and after altering the second user-input query, the vehicle diagnostic device performing a second search using the second user-input query, and displaying results of the second search, the results of the second search relating to at least one possible cause of the given problem.

2. The method of claim 1, wherein:

altering the second user-input query involves adding at least one additional keyword to the second set of keywords, the method further comprising the vehicle diagnostic device using the given problem to identify the at least one additional keyword.

3. The method of claim 2, wherein the second user-input query includes a logical OR of the second set of keywords and the at least one additional keyword.

4. The method of claim 2, wherein the second user-input query includes a logical OR of one keyword in the second set of keywords and the at least one additional keyword.

5. The method of claim 1, wherein:

the vehicle diagnostic device performing the first search using the first user-input query comprises the vehicle diagnostic device (a) sending the first user-input query over at least one network to a search engine that is remote from the vehicle diagnostic device and (b) receiving the results of the first search from the search engine over the at least one network; and the vehicle diagnostic device performing the second search using the second user-input query comprises the vehicle diagnostic device (a) sending the second user-input query over at least one network to the search engine and (b) receiving the results of the second search from the search engine over the at least one network.

6. The method of claim 5, wherein the at least one network includes the Internet.

7. The method of claim 1, wherein the vehicle diagnostic device is a handheld device.

8. The method of claim 1, further comprising:

after displaying the results of the first search and before receiving the second user-input query, the vehicle diagnostic device receiving a user-input selection of one of the results of the first search;

the vehicle diagnostic device storing the user-input selection; and prior to displaying the results of the second search, the vehicle diagnostic device reordering the results of the second search based on the stored user-input selection.

9. A computer readable medium having stored therein instructions for causing a processor to perform the following steps:

a vehicle diagnostic device receiving a first user-input query that (1) identifies a given vehicle and (2) includes a first set of one or more keywords related to a given problem with the given vehicle;

the vehicle diagnostic device caching the first user-input query, performing a first search using the first user-input query, and displaying results of the first search, the results of the first search relating to at least one possible cause of the given problem;

after displaying the results of the first search, the vehicle diagnostic device receiving a second user-input query that (1) identifies the same given vehicle and (2) includes a second set of one or more keywords related to the same given problem with the same given vehicle, wherein the second set of keywords is different than the first set of keywords;

after receiving the second user-input query, the vehicle diagnostic device making a determination that (1) both the first and second user-input queries identify the same given vehicle and (2) both the first and second sets of keywords relate to the same given problem with the same given vehicle;

responsive to making the determination, the vehicle diagnostic device altering the second user-input query, wherein altering the second user-input query involves at least one of (1) adding at least one additional keyword to the second set of keywords and (2) removing at least one keyword from the second set of keywords; and after altering the second user-input query, the vehicle diagnostic device performing a second search using the second user-input query, and displaying results of the second search, the results of the second search relating to at least one possible cause of the given problem.

* * * * *